(No Model.)

J. CALEY.
ADJUSTABLE FRAME SULKY.

No. 287,622. Patented Oct. 30, 1883.

WITNESSES.
Jacob W. Loeper
Havins P. Van Voorhis

INVENTOR.
Jeremiah Caley
By C. P. Jacobs
Atty.

UNITED STATES PATENT OFFICE.

JEREMIAH CALEY, OF BRAZIL, ASSIGNOR OF TWO-THIRDS TO CASPER SCHREPFERMAN AND GEORGE W. MATHIS, OF CLAY COUNTY, IND.

ADJUSTABLE-FRAME SULKY.

SPECIFICATION forming part of Letters Patent No. 287,622, dated October 30, 1883.

Application filed June 23, 1883. (No model.)

*To all whom it may concern:*

Be it known that I, JEREMIAH CALEY, of Brazil, Indiana, have invented a new and useful Improvement in Sulkies for Agricultural Implements, of which the following is a description, reference being made to the accompanying drawings, in the several figures of which like letters indicate like parts.

My invention relates to an improvement in adjustable frames for sulky-plows and other analogous purposes, all of which will be more fully hereinafter described, and pointed out in the claims.

Figure 1:
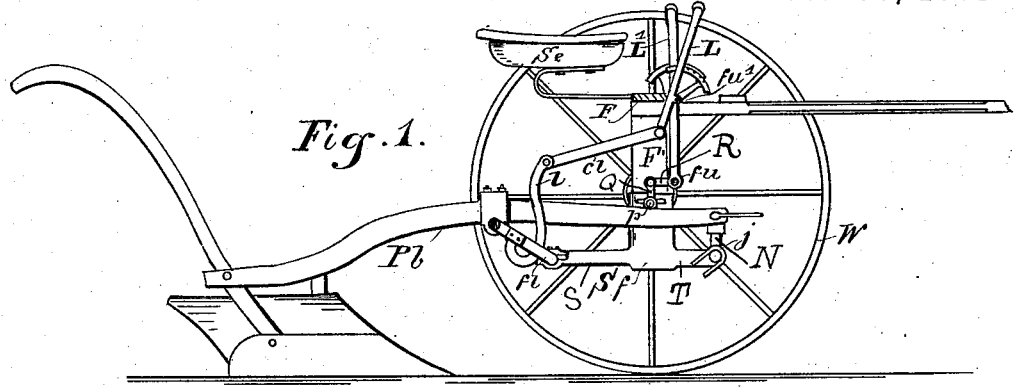
Figure 2:
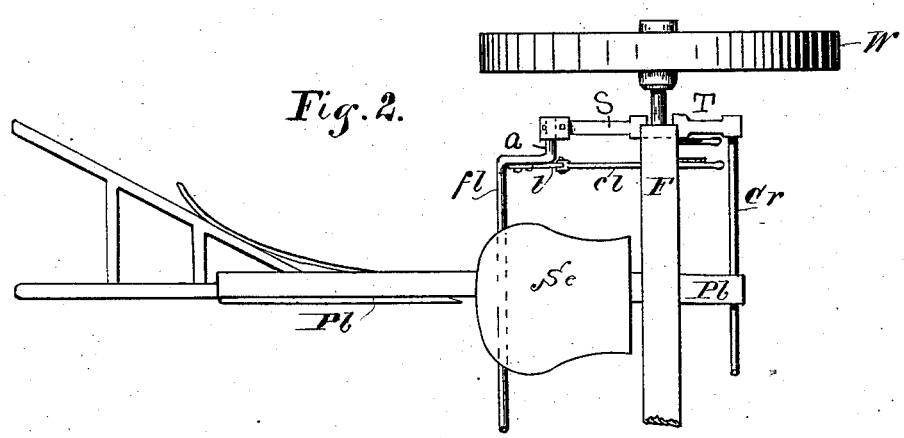
Figure 3:
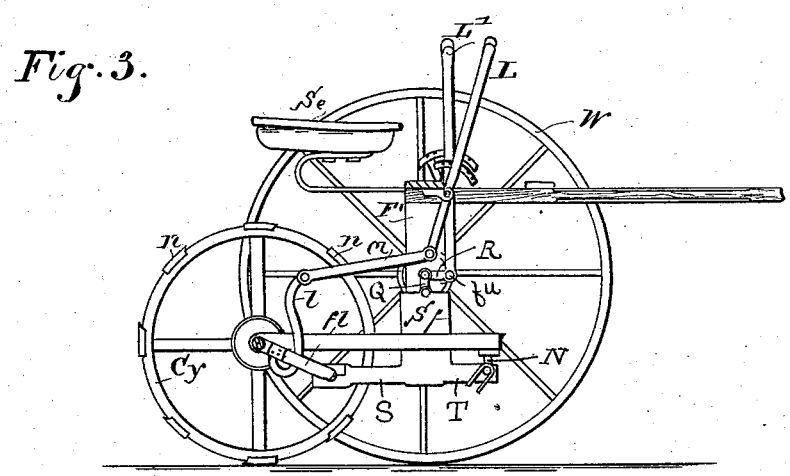

In the drawings, Figure 1 is a side view, one wheel being removed, of my device, with walking-plow attached thereto. Fig. 2 is a top view of the same. Fig. 3 is a view similar to that in Fig. 1, showing a stalk-cutter, instead of a walking-plow, attached.

The letter F represents a cross-bar provided with side standards, F'. The axle of the wheels W is journaled in the standards F'.

$Sf$ are sliding blocks vertically adjustable on standards F'.

T is a forward arm formed integral with the block $Sf$, and S is a rear arm formed integral with said block.

$cr$ is a cross-rod secured in the forward ends of the arm T, and $fl$ is a crank-rod having its arms $a$ journaled in the rear ends of the arms S.

$l$ is an S-shaped rod riveted to the crank of the cross-rod $fl$.

L is a lever fulcrumed at $fw$ to the cross-bar F.

$cl$ is a joint-rod connecting the lower end of lever L to the upper end of the rod $l$.

L' is a lever provided with an arm, R. Said lever is fulcrumed at $fu$ to the upright F'.

Q is a short hanger-arm on the outer end of extension R.

$Pb$ is a plow-beam the forward end of which is secured to and rests upon the cross-rods $fl$ and $cn$. The crank-rod $fl$ is journaled in the beam $Pb$.

N is a short shank uniting the forward end of the plow-beam to the cross-rod $cr$.

$cy$ is a stalk-cutter.

By moving the lever L' forward, the cross-rods $fl$ $cr$ and the plow-beam are elevated through the medium of the right-angled arm F' and hanger-arm Q, the latter being secured to the top of the sliding block $Sf$. The lever L, through the medium of the arm $cl$, lever $l$, and crank-rod $fl$, is adapted to elevate or lift the plow or stalk-cutter over obstructions. Both of these levers L L' are accessible to the driver when in the seat $Se$. Said seat is fixed to the cross-bar F.

What I claim, and desire to secure by Letters Patent, is the following:

1. The lever L, suitably fulcrumed to the fixed frame, the rod $cl$, and lever $l$, fixed to the crank of the cross-rod $fl$, in combination with the sliding block $Sf$, having the arms S T, substantially as described, and for the purpose set forth.

2. The standard F', having the wheels W journaled therein, in combination with the sliding block $Sf$, having arms S T, the cross-rods $fl$ $cr$, and the lever L', fulcrumed to the standard F', said lever being provided with the extension R and hanger Q, substantially as described, and for the purpose set forth.

In witness whereof I have hereunto set my hand and seal this 6th day of June, 1883.

JEREMIAH CALEY. [L. S.]

Witnesses:
C. P. JACOBS,
JACOB W. LOEPER.